(12) United States Patent
Kothari et al.

(10) Patent No.: US 8,725,559 B1
(45) Date of Patent: May 13, 2014

(54) ATTRIBUTE BASED ADVERTISEMENT CATEGORIZATION

(75) Inventors: Rakesh Kothari, Redmond, WA (US); Darren Sillett, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 712 days.

(21) Appl. No.: 12/464,239

(22) Filed: May 12, 2009

(51) Int. Cl.
*G06Q 30/00* (2012.01)
*G06Q 90/00* (2006.01)

(52) U.S. Cl.
CPC .................................... *G06Q 90/00* (2013.01)
USPC .......................................................... 705/14.1

(58) Field of Classification Search
CPC ..................................................... G06Q 90/00
USPC .......................................................... 705/14.1
See application file for complete search history.

(56) References Cited

U.S. PATENT DOCUMENTS 5,991,735 A * 11/1999 Gerace ......................... 705/7.33

* cited by examiner

*Primary Examiner* — Daniel Lastra
(74) *Attorney, Agent, or Firm* — Novak Druce Connolly Bove + Quigg LLP

(57) ABSTRACT

System and methods for categorizing electronic advertisements categorized based on the attributes associated with the creatives, such as product type, predominant color, size of the create, media type of the creative are provided. Categories to be associated with electronic advertisements may be pre-defined, and an electronic advertisement may have various attributes associated with each of these categories.

36 Claims, 6 Drawing Sheets

ATTRIBUTE BASED ADVERTISEMENT CATEGORIZATION

BACKGROUND

As the number of users viewing information and purchasing items electronically increases, there is a corresponding increase in the amount of advertising revenue spent in electronic environments. In some cases, advertisements are targeted to specific users or to specific web pages or other interfaces to be displayed to users. Advertisements also may be selected based on the content displayed on any number different pages displayed to a user or may also be selected based on search information, such as keywords, entered into a search engine as a user searches for content. Advertisements displayed to a user may also be related to the search results.

Sometimes an advertisement provider may not have any electronic advertisement content available that is directed to products, services, or other content being viewed or otherwise accessed by a user. When this occurs, an advertisement for products or services that does not match the content accessed by the user may have to be displayed. It is unknown, however, whether the advertisement will match an interest of the user. As such, the effectiveness of such advertisements may be very limited.

BRIEF DESCRIPTION OF THE DRAWINGS

Various embodiments in accordance with the present disclosure will be described with reference to the drawings, in which.

DETAILED DESCRIPTION

Figure 1:
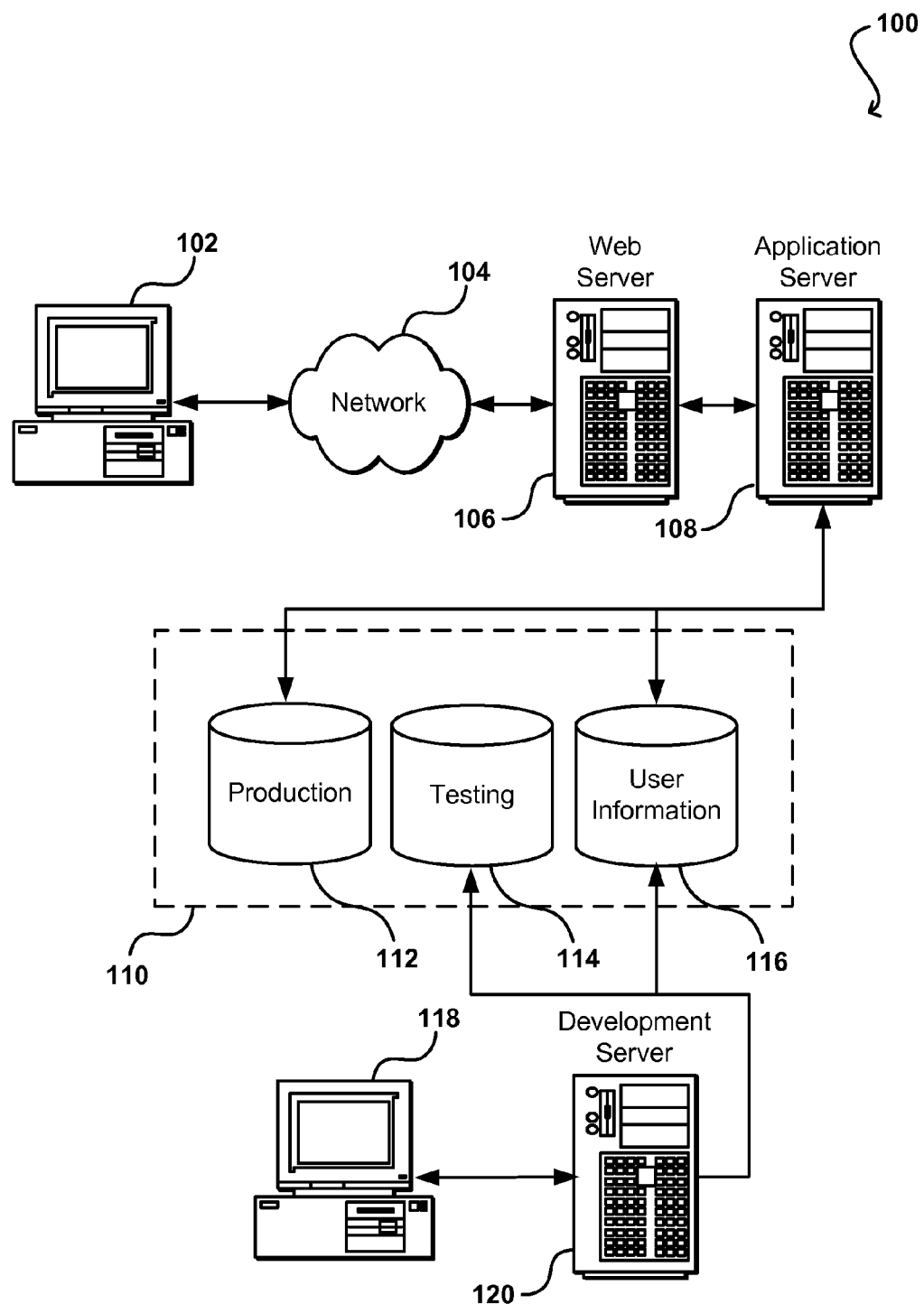
FIG. 1 illustrates an environment in which various embodiments can be implemented.

Systems and methods in accordance with various embodiments of the present disclosure may overcome one or more of the aforementioned and other deficiencies experienced in conventional approaches to selecting an advertisement for display in an electronic environment. As known in the art, "sponsored links" or "sponsored ads" are typically used with electronic interfaces such as Web sites, search engines, applications, etc., wherein an advertiser provides a navigational element such as a hypertext link and associated text and/or graphics to be displayed in the electronic interface, that enable a user to select or otherwise access the navigational element to be directed to a page or other location provided by the advertiser. The advertiser typically will pay a provider of the electronic interface based upon an aspect of each sponsored ad, such as the number of times users select the navigational element included therein.

Boosting the effectiveness of an advertising campaign presents a two-fold problem. It can be advantageous for the right advertisement to be presented to the right users at a given time. Various targeting techniques address the problem of selecting users to be shown an advertisement, but other problems still remain, such as selecting an advertisement to show to those users that will be of interest to the users. Techniques are provided herein for selecting an advertisement that is likely to be highly relevant to a user, and thus has a high potential for generating revenue, such as by generating "click revenue" when the user activates an navigation element of the advertisement.

Providing an optimal advertisement for a user presents a number of challenges. One such challenge is the need for an extensive inventory of creatives (advertisement content) to cover broad as well as minor nuances of user interests. Building such a large inventor is not only costly but difficult to accomplish in a time efficient manner. Another challenge is that user interests are dynamic, requiring a solution that is flexible and can adapt to changing user interests. The systems and methods provided herein overcome these and other difficulties by selecting advertisements to display to a user that are likely to be highly relevant to that user at a point in time.

In an embodiment, advertisement creatives are categorized based on the attributes associated with the creatives, such as product type, predominant color, size of the create, media type of the creative. In an embodiment, categories to be associated with creatives are predefined, and a creative may have various attributes associated with these categories. In an embodiment, advertisers that provide advertisement content to be displayed may also define attributes of the advertisement content for this advertiser provided content.

In an embodiment, a provider of an electronic interface that displays the advertisement may also categorize advertisement provided by advertisers and/or "house" advertisement content. House advertisements content is content that is generated by the provider of an electronic interface rather than being provided by an outside source such as an advertisement agency. "House" content may be generated by selecting advertisement components having attributes preferred by a user to whom the advertisement is to be displayed. The advertisements may be created using predefined templates that enable new advertisements from various advertisement components.

In accordance with various embodiments, techniques disclosed herein for selecting and/or generating a relevant electronic advertisement for a user may be combined with targeted advertising to further boost the effectiveness of the advertisements presented to a user. In targeted advertising, an advertisement can be selected for a product or service that matches the user's preferences. The effectiveness of the advertisement may be increased by selecting an advertisement with attributes of the advertisement match the preferences of the user to whom the user being served.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
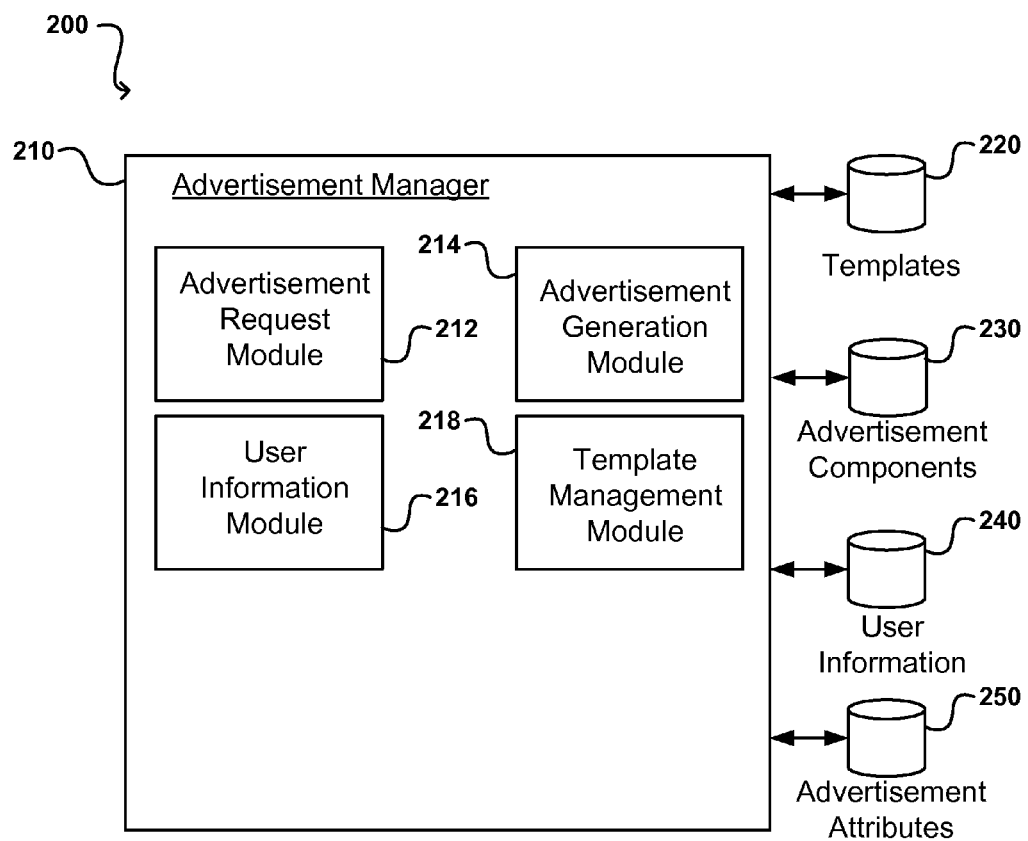
FIG. 2 illustrates components for managing advertisement content related to products and for generating electronic advertisements that can be used in accordance with one embodiment.

An environment such as that illustrated in FIG. 1 can be useful for a provider such as an electronic advertisement content provider that provides electronic advertisements to consumers of electronic advertisements, such as may be displayed on web sites, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2. In this example, an advertising manager 210 responds to requests for electronic advertisements, generates electronic advertisements, and manages components of electronic advertisement and template for creating new advertisements. Advertisement manager 210 includes advertising request module 212, advertisement generation module 214, user information module 216, and template management module 218. Advertisement manager 210 reads and/or writes data to templates data store 220, advertisement components data store 230, user information data store 240, and advertisement attributes data store 250. Data stores 220, 230, 240, and 250 may, in some embodiments, be implemented as part of advertisement manager 210 while in other embodiments of the present invention, data stores 220, 230, 240, and 250 are implemented separately from advertisement manager 210.

Advertising request module 212 processes requests for electronic advertisements received by advertisement manager 210 received from a client, such as a web server requesting electronic advertisements to be integrated into a web page. Advertisement request module 212 may select existing advertisements from advertisement components data store 230 or may request that a new electronic advertisement be generated by advertisement generation module 214. In an embodiment, advertisements are selected based on attributes of the advertisement component and user preferences. For example, a user may respond better to certain types of advertisements, such as Flash-based advertisements rather than advertisements comprising static images or the user may respond better to brightly colored advertisements rather than advertisements having darker colors. A user might also respond better to advertisements that include sounds, while another user prefers advertisements that do not include sound.

User information module 216 provides an interface for retrieving user preference information from and for adding user preference information to user information data store 240. In an embodiment, advertisement request module 212 may access user preference information for use in selecting an advertisement to be displayed to a user by accessing the user preference information via user information module 216, while in other embodiments, advertisement request module 212 may access user information data store 240 directly to retrieve user preference information.

User preferences may be determined using various techniques. User preference information may be determined by tracking the advertisements in which a user has selected or otherwise accessed a navigational element of the advertisement, such as by clicking on the advertisement in a web browser. The advertisements that the user has clicked on can then be analyzed to identify common attributes and these attributes stored as user preferences in user information data store 240. For example, attributes such as the color of the advertisement, the content type (e.g., video, image), size of the advertisement, placement of the advertisement, and/or other attributes might be analyzed to identify common attributes of electronic advertisements that have successfully drawn the interest of the user in the past.

User preference information may also be determined, in some embodiments, based on a user's browsing and/or purchasing history. The content that a user has viewed and/or products or services purchased may be analyzed to identify common attributes of the content or purchased items or services.

User preference information may also be expressly provided by users in some embodiments. For example, some web sites provide the user with a configurable experience where the user can customize at least some aspects of the experience. For example, a web site may enable a user to create a user profile that allows the user to enter certain preferences. These preferences may be incorporated into user information data store 240 for selecting advertisements that are relevant to the user.

In an embodiment, user preference information module 216 may provide an interface for adding user preference information to user information data store 240. In an embodiment, the interface may include a user interface, such as web page, that allows user information to be manually entered by a user or by an operator. In an embodiment, the interface may comprise an electronic interface, such as an application programming interface, for electronically interfacing with the user information data store 240 from an executable program to add information to user information data store 240 or access information stored in user information data store 240.

Advertisement generation module 214 may be used to generate a new electronic advertisement using advertisement components from advertisement components data store 230. Advertisement components data store 230 may include images, video content, text, animated content such as flash and/or other advertisement content. The advertising components may be provided by a third party, such as an advertiser of a product, or may be "house" or stock content created by or purchased by the advertisement provider.

Advertisement attributes data store 250 stores attribute information associated with the various advertising components in advertisement components data store 230. As described above, advertisement components may be categorized based on the attributes of the advertisement components. These attributes may include, but are not limited to, the product type for advertisements components advertising a specific product, a predominant color featured in an advertisement component, a size of the advertisement component, and a media type of the advertisement component. These attributes may be used to generate targeted advertisements for a user based on the user's preferences.

In an embodiment, advertisement generation module 214 may use predefined templates from templates data store 220 to create electronic advertisements using advertisement components from advertisement components data store 230 to generate new electronic advertisements that are relevant to a user's preferences.

Figure 3:
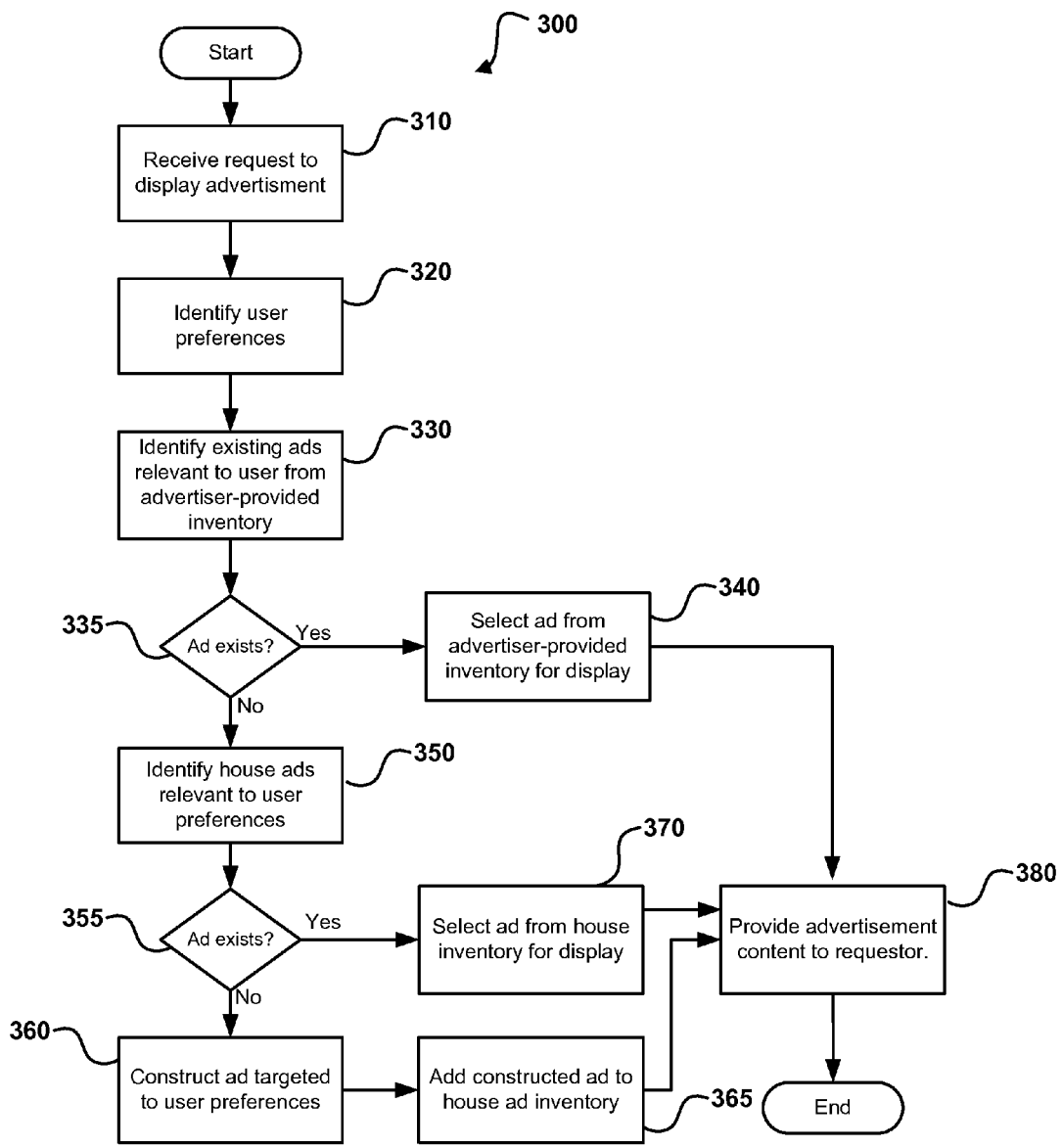
FIG. 3 illustrates steps of a process for selecting an electronic advertisement in accordance with one embodiment.

FIG. 3 illustrates steps of a process 300 for selecting an electronic advertisement in accordance with one embodiment. A request for an electronic advertisement is received 310. Often a request for an advertisement originates from a user loading a web page into a browser application. A web page may include one more embedded advertisements included in the markup language used to encode the layout and content of a page and may provide a uniform resource identifier (URI) that identifies the location of an advertisement on a network, such as the Internet, where the advertisement content can be obtained. In an embodiment, the request may originate from a third party other than the user to which the advertisement is to be displayed. For example, a content provider may request an advertisement to be displayed to a user, receive the advertisement from the electronic advertisement content provider, and present the advertisement to the user.

Once the request has been received, the user's preferred advertisement attributes are identified 320. User preference information may be stored in a user information data store. In an embodiment, each user may be assigned a unique identifier and information related to the user's preferences may be determined by the types of advertisements that the user clicks on or otherwise activates, may be based on the browsing and/or purchase history of the user, and/or may be based on information provided by the user. In an embodiment, the user preference information may be gathered from one or more web content providers or e-commerce sites that the user has visited. Users may also be identified by using various methods, such as using the Internet Protocol (IP) address of the user's computer system or via a login identifier that the user has used to access content on a content provider's website.

If the user information data store does not contain any information for a particular user, user preferences for users having similar attributes might be accessed. For example, the user preferences of users having similar demographic information, such as age, gender, or income, or similar browsing habits, where the request for advertisement originates from a site from which other users in a user information data store have also visited.

Once user preferences have been identified, existing advertisements are identified that match the user's preferences by comparing the user's preferences to the attributes of existing advertisement content stored 330. In one embodiment, advertisement attributes are stored in an advertisement attributes data store. Relevant advertisements are identified based on the attributes of the advertisement, such as the type of advertisement, colors of the advertisement, and size of advertisement. For example, one user may have a greater affinity for video advertisements, while another may have a greater affinity for advertisements comprised of static images that are primarily blue or green. In an embodiment, the type of product being advertised may also be considered when selecting an advertisements. For example, a user may have an interest in music, so an advertisement related to a music-related products may be selected over other advertisements having attributes less relevant to the user's preferences.

A determination is made whether any existing advertisements match the user's preferences 335. As discussed herein, various algorithms can be used to determine whether an advertisement matches user preferences, as well as a level of matching or relatedness. Further, various thresholds can be specified to determine whether an ad "matches" a user's preferences, such as where an ad has a relatedness value that exceeds a minimum relatedness threshold. In some cases, advertisers might specify different thresholds for different ads. If existing advertisements match the user's preferences, an existing advertisement that most closely matches the user's preferences is selected 340 for display to the user. In some cases, this can include selecting an ad that is the best match, or has the highest relatedness value. Various other approaches to selecting the best match can be used in accordance with the various embodiments. The selected advertisement, or a selected group of advertisements sufficiently matching a user's preferences, can be provided to the requestor.

If no existing advertisements match the user's preferences, or meet a minimum level of relatedness, a set of "house" advertisements can be identified that match the user's preferences 350. House advertisements are produced by a source such as the electronic advertisement service provider rather than by the advertisers themselves. House advertisements may be made using stock advertisement components, such as product images and/or other audiovisual content. If house ads exist that matches the user's preferences, a house ad that most closely matches the user's preferences is selected 370, and the selected advertisement is provided to the requestor.

If no existing advertiser-provided or house advertisements match the user's preferences, a new "house" advertisement may be generated that is targeted to the user's preferences 360. The house advertisement may be constructed using templates stored in a template data store and one or more advertising components, such as images, video content, and/or textual content, stored in an advertising components data store. To make the house advertisement relevant to the user, advertising content is selected that has attributes that match as many of the user's preferences as possible. The landing page of the advertisement, the destination to which the user is taken if the user clicks on or otherwise activates a navigational element of the advertisement, is in many cases a detail or listing page of the e-commerce site page that is selling the advertised product or service.

For example, if a user for which an ad is being generated prefers video-based ads, likes the color blue, and likes music, a video-based advertisement featuring a blue portable electronic music player may be generated and presented to the user. Alternatively, if no video content is available, a static image advertisement featuring a blue portable electronic music player may be generated and presented to the user. In the event that no image of a blue portable electronic music player is available, an advertisement may be generated for a portable electronic music player that includes a blue background. Furthermore, in the event that no imagery for portable electronic music players is available in the stock imagery, an advertisement having a blue background may be generated selected even if the product doesn't match any of the user preferences.

In another example, a customized advertisement for a credit card targeted to a user's preferences could be generated. The customized advertisement could be generated based on the user's color and/or content-type preferences combined with the user's browsing and/or purchasing history to generate a customized advertisement. For example, referring back to the previous example where the user prefers the color blue and has recently been searching for an electronic music player, an advertisement using a blue color palette featuring an electronic music player may be generated including text that says "Like music? Why not purchase this with your Visa card today?" If the user clicks the advertisement, the e-commerce site's page selling the electronic music player will be displayed to the user. The advertisement might also be repeated on this page, once again encouraging to use his or her credit card to purchase this item. The benefits of this approach are at least twofold: (1) the advertisement encourages user to purchase an item from the e-commerce site that the user has shown interest in, and (2) the advertisement also encourages the user to use the advertised credit card in the process, which benefits the advertiser.

The newly constructed house ad may then be added to the house advertisement inventory stored in an advertisement component's data store, and the attributes of the newly created advertisement added to an advertisement attributes data store. The newly created advertisement is then provided to the requestor.

Figure 4:
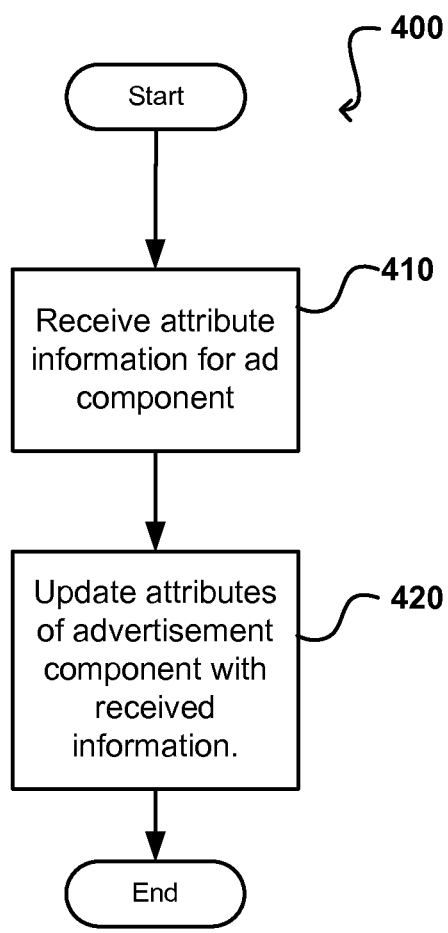
FIG. 4 illustrates steps of a process for categorizing electronic advertisement components in accordance with one embodiment.

FIG. 4 illustrates steps of a process 400 for categorizing electronic advertisement components in accordance with one embodiment. An electronic advertisement content provider may maintain an extensive inventory of advertisement components, such as a images, videos, text, animations, and/or other audiovisual components that may be used to create advertisements, such as an advertisement components data store. In order to use this inventory to create electronic advertisements, the advertisement components in this embodiment are first categorized. Each component is associated with a set of attributes, such as the overall color (or colors) of the advertisement, type (image, Flash, video, audio), size of the advertising component, and subject matter.

Attribute information may be received for an advertising component from various sources 410. Attributes of advertisement components may be identified manually by people identifying attributes of individual advertisement components, through various automated techniques, or a combination thereof. For example, some advertising components may be provided by an advertiser who also provides values for the set of attributes associated with the components. In other embodiments, the electronic advertisement content provider may have a set of advertisement components and perform the categorization.

The inventory of advertisement components may become prohibitively large such that manual processing by the electronic advertisement content provider alone becomes infeasible. In some instances, automated processing of advertisement content may be performed to extract attributes from the advertisement content. For example, a computer program may be executed to identify specific attributes of an advertising component, such as the type of media of the advertising component, the size of the content, and the dominant color of the component if the component is an image or video content. An electronic advertisement content provider may also outsource some or all manual identification of attributes related to an advertising component through an outsourcing service such as Amazon.com's Mechanical Turk, where human intelligence is better able to perform certain tasks than a computer. For example, an electronic advertisement content provider may use contract workers to identify objects in or the subject matter of an image or video. According to some embodiments, a graphical user interface, such as a web page, is provides an interface that enables attributes to be defined for advertisement components.

The attributes associated the advertisement are updated to include the attribute information received information 420. The attributes may be stored in an advertisement components data store with the advertisement components or stored in separate data store. The attributes associated with a particular advertisement component may be updated periodically as new attributes are tracked by the system.

Figure 5:
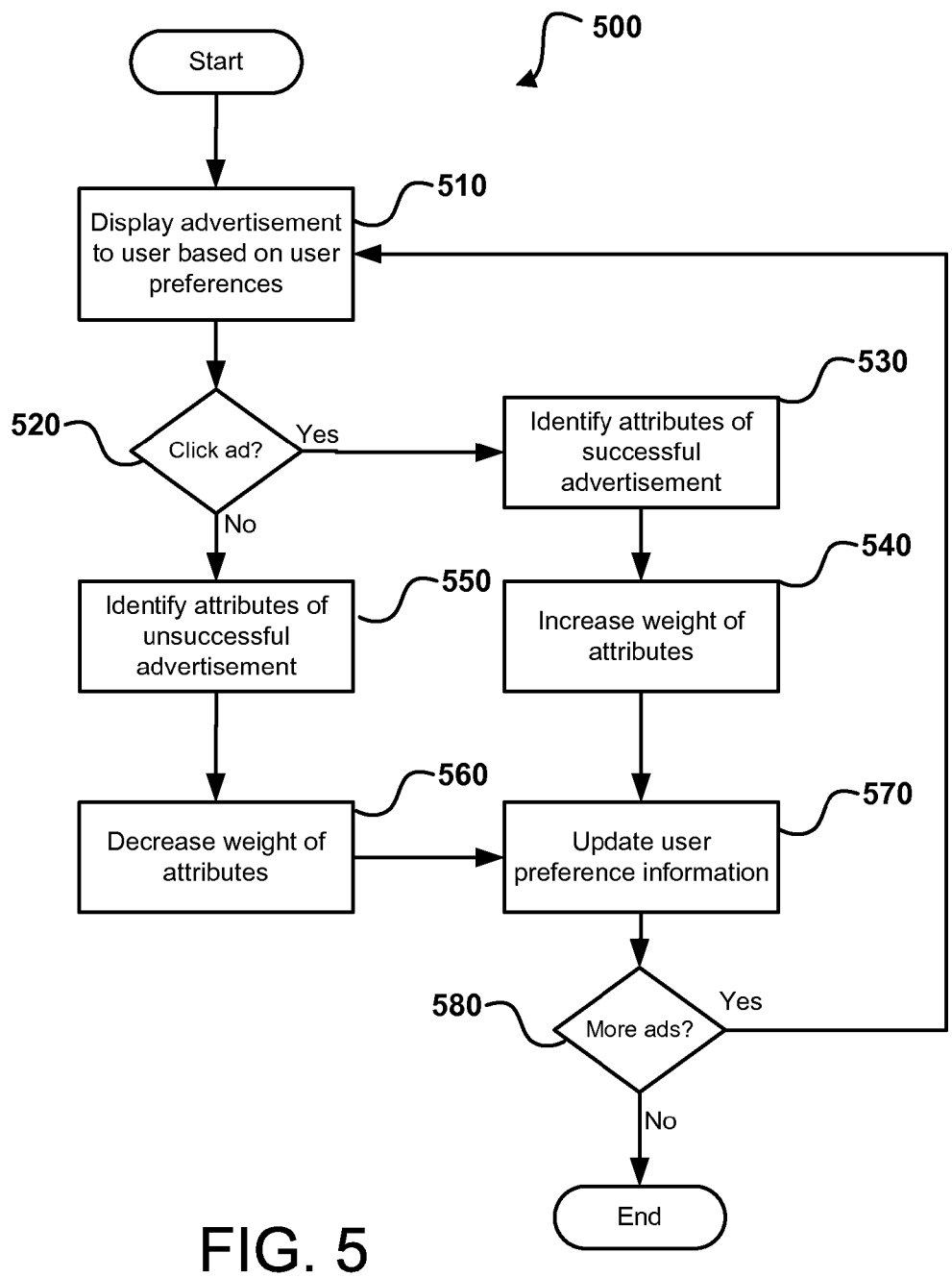
FIG. 5 illustrates steps of a process for measuring the effectiveness of an electronic advertisements and adjusting user preferences to match attributes of effective advertisements in accordance with one embodiment.

FIG. 5 illustrates steps of a process 500 for measuring the effectiveness of electronic advertisements and adjusting user preferences to match attributes of effective advertisements in accordance with one embodiment. Process 500 provides feedback loop for adjusting the importance of various user preferences for determining which advertisements to present to a user. User preferences are dynamic and can change over time, and process 500 accounts for these changes by modifying user preferences over time based on the attributes of the advertisements presented to the user.

An advertisement is displayed to a user 510. As described above, an electronic advertisement may be presented to a user as part of the content on a web page or ecommerce site. Advertisers want to ensure that the most relevant advertisements are presented to a user. A determination is made whether the selects or otherwise activates a navigation element in the advertisement 520, such as clicking the advertisement to activate a hyperlink. Other activity with respect to the advertisement can be monitored and/or determined as well.

If the user activates the navigational element of the advertisement, for example, the advertisement is deemed to be relevant to the user and the attributes of the successful advertisement are identified 530. The user preference information for the user may include one or more preferred attributes, and each attribute may be associated with a weight factor used to represent the relative importance of the attribute to other preferred attributes associated with the user. The weight factor may be used to select existing electronic advertisements having attributes most relevant to the user or to generate new electronic advertisements that include preferred attributes most relevant to the user. In an embodiment, for each attribute of the successful advertisement, the weight associated with a corresponding preferred attribute of the user may be incremented by a predetermined amount. For example, a user may have the following set of preferred attributes associated with the user: (1) color=blue (+80), color=yellow (+20); (2) type=video(+20), type=image(+80); (3) format=banner(+100). In this illustrative example, each time that a user clicks on or otherwise activates a navigational element of an advertisement, the weight associated with attributes of the selected advertisement is increased by twenty. The user has clicked on four advertisements that are blue and one that is yellow, one video advertisement, four advertisements comprising static images, and five advertisements formatted as banner advertisements.

In an embodiment, if the user's preferred attributes do not include a preferred attribute corresponding an attribute of the successful advertisement, the attribute of the successful advertisement may be added as a new preferred attribute for the user. Returning now to the previous example, the user clicks on a skyscraper format advertisement (rectangular advertisement format with length of advertisement running vertically rather than horizontally like a banner advertisement), with a primary color red, and static image type. The user's preferred attributes may then be updated to reflect this selection: (1) color=blue (+80), color=yellow (+20), color=red (+20); (2) type=video(+20), type=image(+100); (3) format=banner(+100), format=skyscraper (+20).

If the user does not activate the navigational element of the advertisement, the attributes of the unsuccessful advertisement are identified 550. In an embodiment, for each attribute of the unsuccessful advertisement, the weight associated with a corresponding preferred attribute of the user may be decremented by a predetermined amount. Returning again to the previous example, the user does not click on a blue banner advertisement, comprising a static image. The user's preferred attributes may then be updated to reflect the unsuccessful advertisements: (1) color=blue (+60), color=yellow (+20), color=red (+20); (2) type=video(+20), type=image(+80); (3) format=banner(+80), format—skyscraper (+20).

In an embodiment, the amount decremented from the weights of attributes associated with an unsuccessful advertisement may be smaller than the amount added to the weights of attributes associated with a successful advertisement. Returning once again to the previous example, where the user does not click on a blue banner advertisement, comprising a static image. Instead of decrementing the weights associated with the user's preferences by twenty, which is equal to the amount added to the weights of attributes of successful advertisements, the amount decremented here is 1. The user's preferred attributes may then be updated accordingly: (1) color=blue (+79), color=yellow (+20), color=red (+20); (2) type=video(+20), type=image(+99); (3) format=banner(+99), format=skyscraper (+20).

In an embodiment, if the weight associated with a preferred attribute of a user falls below a predetermined threshold, the preferred attribute may be removed from the user's preference information so that the attribute is not used to select existing electronic advertisements having attributes most relevant to the user or to generate new electronic attributes that include preferred attributes most relevant to the user.

The representations of the user's preferred attributes and the amounts added and decremented from the weights associated with the various user preferences are merely illustrative and are not intended to be limiting. Other representations of the user's preferred attributes may be used in other embodiments, and different techniques for weighting of attributes may be used. For example, different attributes may have different amounts added and subtracted from their weights.

The user preference information is updated to information 570. For example, the user preference information may be stored in a user information data store, and the user information data store may be updated to reflect the new weights associated with the user preferences and/or to add or remove preferences for the user.

A determination is made whether another advertisements is be presented to the user 580. The advertisement is presented to the user 510 if the another advertisement was to be presented to the user and process 500 continues according to the steps described above. If no additional advertisement is to be presented to the user, process 500 terminates. Process 500 may be executed intermittently as requests for an advertisements are received.

The techniques described above may also be used to optimize the selection of content for display to users by an electronic content provider, such as an web portal operator. A web portal provides an interface from various sources of information, and may provide a various services associated including email, news feeds, and other information.

Figure 6:
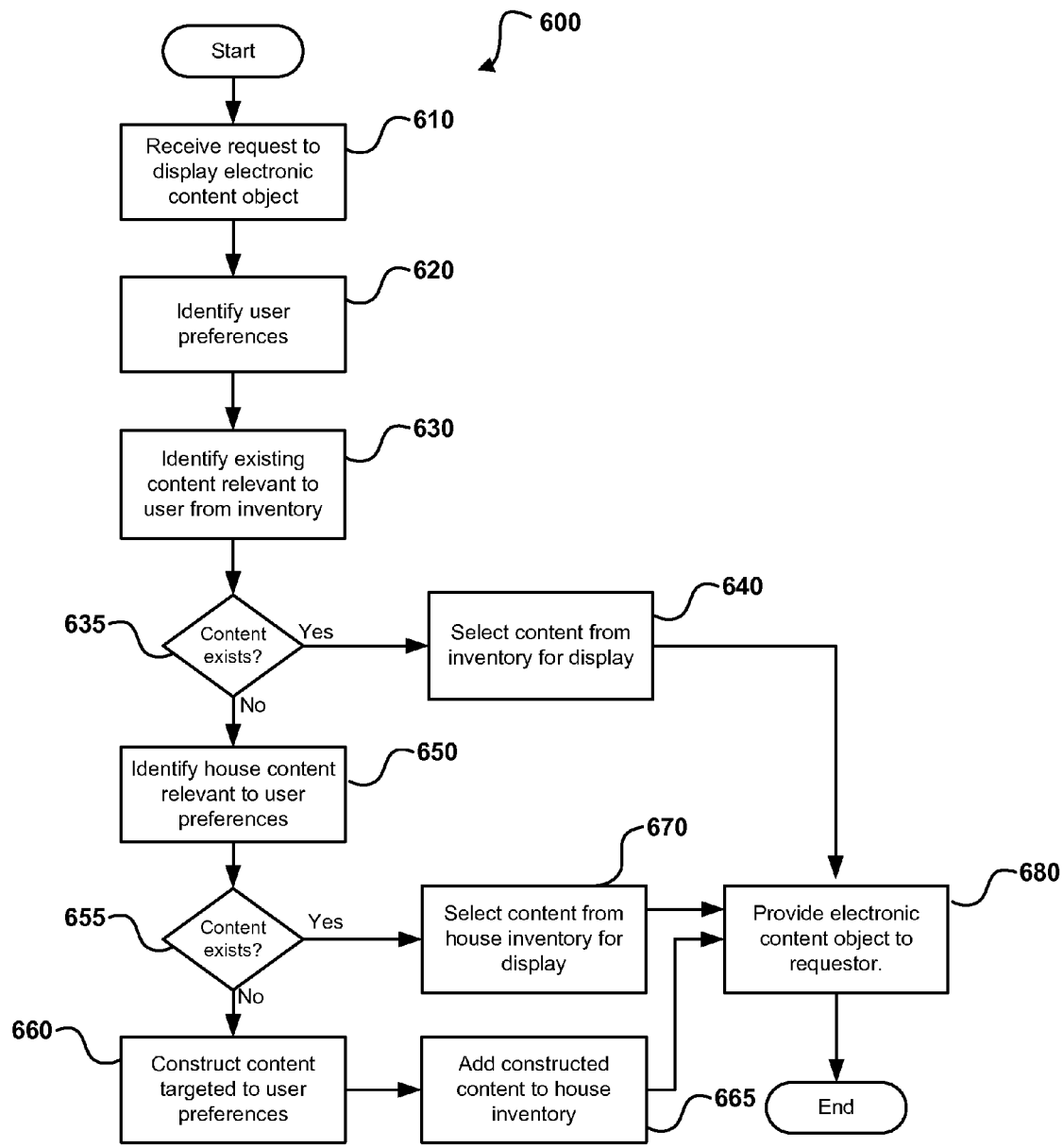
FIG. 6 illustrates steps of a process for selecting an electronic content object in accordance with one embodiment.

FIG. 6 illustrates steps of a process 600 for selecting an electronic content object in accordance with one embodiment. An electronic content object might include textual content, may include images, video content, text, animated content such as flash and/or other electronic content. A request for an electronic content object is received 610. Often a request for an electronic content object originates from a user loading a web page into a browser application. A web page may include one more embedded electronic content objects included in the markup language used to encode the layout and content of a page and may provide a uniform resource identifier (URI) that identifies the location of an advertisement on a network, such as the Internet, where the advertisement content can be obtained. In an embodiment, the request may originate from a third party other than the user to which the electronic content object is to be displayed. For example, a content provider may request an electronic content object to be displayed to a user, receive the electronic content object from the electronic content object provider, and present the advertisement to the user.

Once the request has been received, the user's preferred content attributes are identified 620. User preference information may be stored in a user information data store. In an embodiment, each user may be assigned a unique identifier and information related to the user's preferences may be determined by the types of electronic content for which the user searches, may be based on the browsing and/or purchase history of the user, and/or may be based on information provided by the user. In an embodiment, the user preference information may be gathered from one or more web content providers or e-commerce sites that the user has visited. Users may also be identified by using various methods, such as using the Internet Protocol (IP) address of the user's computer system or via a login identifier that the user has used to access content on a content provider's website.

If the user information data store does not contain any information for a particular user, user preferences for users having similar attributes might be accessed. For example, the user preferences of users having similar demographic information, such as age, gender, or income, or similar browsing habits, where the request for advertisement originates from a site from which other users in a user information data store have also visited.

Once user preferences have been identified, existing advertisements are identified that match the user's preferences by comparing the user's preferences to the attributes of existing advertisement content stored 630. In one embodiment, electronic content objects are stored in a data store. Relevant electronic content objects may be identified based on the attributes of the electronic content objects, such as the type of electronic content object, colors of the electronic content object, and size of electronic content object. For example, one user may have a greater affinity for video electronic content, while another may have a greater affinity for static image content that are primarily blue or green in color. In an embodiment, subject matter of the electronic content object may also be considered when selecting an electronic content object. For example, a user may have an interest in travel, so an electronic content object related to a travel, such as a travel article on travel in Australia may be selected over other electronic content objects having attributes less relevant to the user's preferences, such as an article on auto repair.

A determination is made whether any existing electronic content objects match the user's preferences 635. As discussed herein, various algorithms can be used to determine whether an electronic content object matches user preferences, as well as a level of matching or relatedness. Further, various thresholds can be specified to determine whether an electronic content object "matches" a user's preferences, such as where an electronic content objects has a relatedness value that exceeds a minimum relatedness threshold. If existing electronic content objects match the user's preferences, an existing electronic content object that most closely matches the user's preferences is selected 640 for display to the user. In some cases, this can include selecting an electronic content object that is the best match, or has the highest relatedness value. Various other approaches to selecting the best match can be used in accordance with the various embodiments. The selected electronic content object, or a selected group of electronic content objects sufficiently matching a user's preferences, can be provided to the requestor.

If no existing electronic content objects match the user's preferences, or meet a minimum level of relatedness, a set of "house" electronic content objects can be identified that match the user's preferences 650. House electronic content objects are produced by a source such as a web portal operator rather than by third party content providers. House electronic content objects may be made using stock electronic content object components, such as images, video, text and/or other audiovisual content. If house electronic content objects exist that matches the user's preferences, a house electronic content object that most closely matches the user's preferences is selected 670, and the selected electronic content object is provided to the requestor.

If no existing third party or house electronic content objects match the user's preferences, a new "house" electronic content object may be generated that is targeted to the user's preferences 660. The house electronic content object may be constructed using templates stored in a template data store and one or more advertising components, such as images, video content, and/or textual content, stored in an electronic content object components data store. To make the house electronic content object relevant to the user, electronic content object content is selected that has attributes that match as many of the user's preferences as possible.

For example, if a user for which an electronic content object is being generated prefers video-based content, likes the color blue, likes travel, video-based electronic content featuring the highlights from the Great Barrier Reef in Australia. Alternatively, if no video content is available, a travel article featuring a static image of the Blue Lagoon in Iceland might be selected. Furthermore, if no imagery featuring travel-related subject matter is available, a text travel article may be selected and displayed using a blue color palette.

The newly constructed house ad may then be added to the house electronic content object inventory stored in an electronic content object data store, and the attributes of the newly created electronic content object added to an electronic content attributes data store. The newly created advertisement is then provided to the requestor.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for providing electronic advertisements, the method comprising:
   under control of one or more computer systems configured with executable instructions,
   categorizing, at a server, a plurality of electronic advertisement content based upon one or more attributes of the advertisement content;
   receiving, at the server, a request for an electronic advertisement for display to a user;
   determining, at the server, whether an electronic advertisement from the plurality of electronic advertisement content for display to the user matches preferred attributes from a set of user attributes and preferences associated with the user; and determining, at the server, that none of the plurality of electronic advertisements match the preferred attributes of the user;

creating, at the server, a new electronic advertisement using the preferred attributes from the set of user attributes and preferences in response to the determination that none of the plurality of electronic advertisements match the preferred attributes of the user, wherein creating the new electronic advertisement further comprises:

selecting an advertisement template from a templates datastore for creating new electronic advertisements;

creating the new electronic advertisement using the selected advertisement template and at least one component from an advertisement component datastore comprising at least one component from the plurality of electronic advertisement content; and customizing the attributes of the new electronic advertisement to include at least one attribute matching a user attribute or preference of the user; and providing the determined electronic advertisement that matches the preferred attributes of the user or the newly created electronic advertisement to the requestor.

2. The method of claim 1, wherein selecting an advertisement template comprises:

selecting an advertisement template having a media type that matches a media type preferred by the user.

3. The method of claim 1, wherein customizing the attributes of the new electronic advertisement to have attributes preferred by the user further comprises:

setting at least one of a size and a color of the new electronic advertisement to match a size and color preferred by the user.

4. The method of claim 1 wherein customizing the attributes of the new electronic advertisement to have attributes preferred by the user further comprises:

setting a language of the new electronic advertisement to match a language preferred by the user.

5. The method of claim 1 further comprising:

defining additional attributes of the electronic advertisement content to be used to categorize the electronic advertisement content; and categorizing the plurality of electronic advertisement content based upon the additional attributes.

6. The computer-implemented method of claim 1, wherein the plurality of electronic advertisement content are third party electronic advertisement content, and wherein the electronic advertisement component datastore further comprises components associated with house electronic advertisement content that are non-third party advertisement content.

7. A computer-implemented method for providing electronic advertisements, the method comprising:

under control of one or more computer systems configured with executable instructions, categorizing a plurality of electronic advertisement content based upon attributes of the advertisement content;

receiving a request for an electronic advertisement for display to a user;

determining whether an electronic advertisement from the plurality of electronic advertisement content for display to the user matches preferred attributes from a set of user attributes and preferences associated with the user;

determining that none of the plurality of electronic advertisements match the preferred attributes of the user;

creating a new electronic advertisement using the preferred attributes from the set of user attributes and preferences in response to the determination that none of the plurality of electronic advertisements match the preferred attributes of the user, the new electronic advertisement created from one or more components selected from an electronic advertisement component datastore comprising at least one component from the plurality of electronic advertisement content; and providing the determined electronic advertisement that matches the preferred attributes of the user or the new electronic advertisement to the requestor to be presented to the user.

8. The method of claim 7, wherein identifying the electronic advertisement comprises:

determining whether a relatedness value of the user with a particular electronic advertisement from the plurality of electronic advertisement content exceeds a minimum relatedness threshold.

9. The method of claim 7, wherein creating the new electronic advertisement using the preferred attributes from the set of user attributes and preferences further comprises:

selecting a template for creating the new electronic advertisement;

selecting components of the advertising content having attributes similar to the preferred attributes from the set of user attributes and preferences of the user;

generating the new electronic advertisement using the selected template; and customizing the attributes of the new electronic advertisement to have attributes preferred by the user.

10. The method of claim 9, wherein customizing the attributes of the new electronic advertisement to have attributes preferred by the user further comprises:

setting at least one of a color of the new electronic advertisement to match a color preferred by the user, a size of the new electronic advertisement to match an advertisement size preferred by the user, and a language of the new electronic advertisement to match a language preferred by the user.

11. The method of claim 7, wherein the plurality of electronic advertisement content comprises advertiser-provided advertisements and house advertisements, wherein identifying the electronic advertisement comprises:

determining whether the advertiser-provided advertisements match the preferences associated with the user; and determining whether the house advertisements match the preferences associated with the user when none of the advertiser-provided advertisements match with the preferences associated with the user.

12. The method of claim 7 further comprising:

defining additional attributes of the electronic advertisement content to be used to categorize the electronic advertisement content; and categorizing the plurality of electronic advertisement content based upon the additional attributes.

13. The computer-implemented method of claim 7, wherein the plurality of electronic advertisement content are third party electronic advertisement content, and wherein the electronic advertisement component datastore further comprises components associated with house electronic advertisement content that are non-third party advertisement content.

14. The method of claim 8, wherein the relatedness value is determined based on attributes of the particular electronic advertisement and preferences associated with the user.

15. A system for providing electronic advertisements, the server comprising:
a processor; and
a memory device including instructions that, when executed by the processor, cause the processor to:
categorize, at the processor, a plurality of electronic advertisement content based upon attributes of the advertisement content;
receive, at the processor, a request for an electronic advertisement for display to a user;
determine, at the processor, whether an advertisement from the plurality of electronic advertisement content for display to the user matches preferred attributes from a set of user attributes and preferences associated with the user;
determine, at the processor, that none of the plurality of electronic advertisement content match the preferred attributes of the user;
create, at the processor, a new electronic advertisement using the preferred attributes from the set of user attributes and preferences in response to the determination that none of the plurality of electronic advertisement content match the preferred attributes of the user, the new electronic advertisement created from one or more components selected from an electronic advertisement component datastore comprising at least one component from the plurality of electronic advertisement content; and
provide the determined electronic advertisement that matches the preferred attributes of the user or the new electronic advertisement to the requestor to be presented to the user.

16. The system of claim 15, wherein the instructions to identify the advertisement from the plurality of electronic advertisement content, when executed by the processor, cause the processor to:
determine whether a relatedness value of the user with a particular electronic advertisement from the plurality of electronic advertisement content exceeds a minimum relatedness threshold.

17. The system of claim 16 wherein the memory device further includes instructions that, when executed by the processor, cause the processor to
define additional attributes of the electronic advertisement content to be used to categorize the electronic advertisement content; and
categorize the plurality of electronic advertisement content based upon the additional attributes.

18. The system of claim 16, wherein the relatedness value is determined based on attributes of the particular electronic advertisement and preferences associated with the user.

19. The system of claim 15, wherein the instructions to create the new electronic advertisement using the preferred attributes from the set of user attributes and preferences, when executed by the processor, cause the processor to:
select an advertisement template for creating the new advertisement;
select at least one component of the advertising content from the electronic advertisement content having attributes similar to the preferred attributes from the set of user attributes and preferences of the user;
generate the new advertisement using the advertisement template and the at least one component of the advertising content; and customize the attributes of the new electronic advertisement to have attributes preferred by the user.

20. The system of claim 19, wherein the instructions to customize the attributes of the new electronic advertisement to have attributes preferred by the user, when executed by the processor, cause the processor to:
set at least one of a color of the electronic advertisement to match a color preferred by the user, a size of the new electronic advertisement to match an advertisement size preferred by the user, and a language of the new electronic advertisement to match a language preferred by the user.

21. The system of claim 15, wherein the plurality of electronic advertisement content comprises advertiser-provided advertisements and house advertisements, wherein the instructions to identify the electronic advertisement, when executed by the processor, cause the processor to:
determine whether the advertiser-provided advertisements match the preferences associated with the user; and
determine whether the house advertisements match the preferences associated with the user when none of the advertiser-provided advertisements match with the preferences associated with the user.

22. The system of claim 15, wherein the plurality of electronic advertisement content are third party electronic advertisement content, and wherein the electronic advertisement component datastore further comprises components associated with house electronic advertisement content that are non-third party advertisement content.

23. A computer program product for providing electronic advertisements, the program being embedded in a computer-readable medium and including instructions that, when executed by at least one computing device, cause the at least one computing device to:
categorize, at a processor, a plurality of electronic advertisement content based upon attributes of the advertisement content;
receive, at the processor, a request for an electronic advertisement for display to a user;
determine, at the processor, whether an advertisement from the plurality of electronic advertisement content for display to the user matches preferred attributes from a set of user attributes and preferences associated with the user;
determine, at the processor, that none of the plurality of electronic advertisement content match the preferred attributes of the user;
create, at the processor, a new electronic advertisement using the preferred attributes from the set of user attributes and preferences in response to the determination that none of the plurality of electronic advertisement content match the preferred attributes of the user, the new electronic advertisement created from one or more components selected from an electronic advertisement component datastore comprising at least one component from the plurality of electronic advertisement content; and
provide the determined electronic advertisement content that matches the preferred attributes of the user or the new electronic advertisement to the requestor to be presented to the user.

24. The computer program product of claim 23, wherein the instructions that cause the at least one computing device to identify the advertisement from the plurality of electronic advertisement content comprise further comprising instructions that cause the at least one computing device to:

determine whether a relatedness value of the user with a particular electronic advertisement from the plurality of electronic advertisement content exceeds a minimum relatedness threshold.

25. The computer program product of claim 23, wherein the instructions that cause the at least one computing device to create a new electronic advertisement using the preferred attributes from the set of user attributes and preferences when no advertisement is identified further comprise instructions that cause the at least one computing device to:
select an advertisement template for creating the new electronic advertisement;
select at least one component of advertising content from the electronic advertisement content having attributes similar to the preferred attributes from the set of user attributes and preferences of the user;
generate the new electronic advertisement using the advertisement template and the at least one component of the advertising content; and
customize the attributes of the new electronic advertisement to have attributes preferred by the user.

26. The computer program product of claim 23, wherein the instructions that cause the at least one computing device to customize the attributes of the new electronic advertisement to have attributes preferred by the user comprise instructions that cause the at least one computing device to:
set at least one of a color of the new electronic advertisement to match a color preferred by the user, a size of the new electronic advertisement to match an advertisement size preferred by the user, and a language of the new electronic advertisement to match a language preferred by the user.

27. The computer program product of claim 23, wherein the plurality of electronic advertisement content comprises advertiser-provided advertisements and house advertisements, wherein the instructions that cause the at least one computing device to customize the attributes of the new electronic advertisement to identify the electronic advertisement to have attributes preferred by the user further comprise instructions that cause the at least one computing device to:
determine whether the advertiser-provided advertisements match the preferences associated with the user; and
determine whether the house advertisements match the preferences associated with the user when none of the advertiser-provided advertisements match with the preferences associated with the user.

28. The computer program product of claim 23, wherein the plurality of electronic advertisement content are third party electronic advertisement content, and wherein the electronic advertisement component datastore further comprises components associated with house electronic advertisement content that are non-third party advertisement content.

29. A computer-implemented method for providing electronic content objects, the method comprising:
under control of one or more computer systems configured with executable instructions,
categorizing, at a processor, a plurality of electronic content objects based upon attributes of the electronic content objects;
receiving, at the processor, a request for an electronic content object for display to a user;
determining, at the processor, whether an electronic content object from the plurality of electronic content object components for display to the user matches preferred attributes from a set of user attributes and preferences associated with the user;
determine, at the processor, that none of the plurality of electronic content objects match the preferred attributes of the user;
creating, at the processor, a new electronic content object using the preferred attributes from the set of user attributes and preferences in response to the determination that none of the plurality of electronic advertisement content match the preferred attributes of the user, the new electronic content object created from one or more components selected from an electronic content object component datastore comprising at least one component from the plurality of electronic content objects; and
providing the determined electronic content object that matches the preferred attributes of the user or the new electronic content object to the requestor to be presented to the user.

30. The method of claim 29, wherein identifying the electronic content object comprises:
determining whether a relatedness value of the user with a particular electronic content object from the plurality of electronic content object components exceeds a minimum relatedness threshold.

31. The method of claim 30, wherein the relatedness value is determined based on attributes of the particular electronic content object and preferences associated with the user.

32. The method of claim 29, wherein creating the new electronic content object using the preferred attributes from the set of user attributes and preferences comprises:
selecting a template for creating the new electronic content object;
selecting electronic content object components from the plurality of electronic content object components having attributes similar to the preferred attributes from the set of user attributes and preferences of the user;
generating the new electronic content object using the template and the selected electronic object components; and
customizing the attributes of the new electronic content object to have attributes preferred by the user.

33. The method of claim 32, wherein customizing the attributes of the new electronic content object to have attributes preferred by the user comprises:
setting at least one of a color of the new electronic content object to match a color preferred by the user, a size of the new electronic content object to match an advertisement size preferred by the user, and a language of the new electronic advertisement to match a language preferred by the user.

34. The method of claim 29, wherein the plurality of electronic content object components comprises advertiser-provided advertisements and house advertisements, wherein identifying the electronic content object comprises:
determining whether the advertiser-provided advertisements match the preferences associated with the user; and
determining whether the house advertisements match the preferences associated with the user when none of the advertiser-provided advertisements match with the preferences associated with the user.

35. The method of claim 29 further comprising:
defining additional attributes of the electronic advertisement content components to be used to categorize the plurality of electronic content object components; and
categorizing the plurality of electronic content object components based upon the additional attributes.

36. The method of claim 29, wherein the plurality of electronic content objects are third party electronic content objects, and wherein the electronic content object component datastore further comprises components associated with house electronic content objects at are non-third party electronic content objects.

\* \* \* \* \*